United States Patent [19]

Fonte et al.

[11] Patent Number: 4,804,701
[45] Date of Patent: Feb. 14, 1989

[54] COMPOSITION ON THE BASIS OF FLUORINATED POLYMERS IN AQUEOUS DISPERSION, CONTAINING ALKOXYSILANES, FOR COATING METAL SURFACES

[75] Inventors: Alberto Fonte, Pavia; Angelo Tentorio, Novara; Daria Lenti, Valenza, all of Italy

[73] Assignee: Ausimont S.p.A., Milan, Italy

[21] Appl. No.: 96,449

[22] Filed: Sep. 15, 1987

[30] Foreign Application Priority Data

Sep. 16, 1986 [IT] Italy ................................ 21708 A/86

[51] Int. Cl.[4] ........................... C08K 5/24; C09K 3/00; C08L 27/18
[52] U.S. Cl. .................................... 524/262; 524/546; 106/287.11
[58] Field of Search ............................. 524/262, 546; 106/287.11, 287.16

[56] References Cited

U.S. PATENT DOCUMENTS

| | | | |
|---|---|---|---|
| 2,688,006 | 8/1954 | Steinman | 106/287.16 |
| 2,834,693 | 5/1958 | Jellinek | 106/287.15 |
| 4,482,476 | 1/1984 | Yoshimura et al. | 524/262 |
| 4,495,247 | 1/1985 | Vasta | 524/546 |
| 4,506,054 | 3/1985 | Vasta | 524/546 |

Primary Examiner—Theodore Morris
Attorney, Agent, or Firm—Stevens, Davis, Miller & Mosher

[57] ABSTRACT

Composition on the basis of fluorinated polymers in aqueous dispersion, having a basic pH, containing alkoxysilanes and magnesium and/or aluminum as cations complexed with amino- or hydroxy-carboxy acids, acting as bonding agents, suitable to constitute a highly-adhesive layer, on metal surfaces, in particular as a primer.

5 Claims, No Drawings

COMPOSITION ON THE BASIS OF FLUORINATED POLYMERS IN AQUEOUS DISPERSION, CONTAINING ALKOXYSILANES, FOR COATING METAL SURFACES

FIELD OF THE INVENTION

The present invention relates to a composition suitable to form a coating layer on metal articles, in particular of iron or of aluminum or of alloys thereof, said coating layer showing a very high adhesion to the metal substrate, and being suitable for being used as a primer for the application of subsequent finishing coating layers.

BACKGROUND OF THE INVENTION

The use is well-known of aqueous dispersions of polytetrafluoroethylene (PTFE) for obtaining coatings endowed with a high resistance to heat and to the chemical agents, with good mechanical strength to wear and friction. The use is also well-known of PTFE modified with small amounts of a mostly fluorinated comonomer, as well as that of PTFE blends with other fluorinated polymers, for the purpose of obtaining improved characteristics of impermeability and of flexibility of the coating layer. The essential technical problem in the accomplishment of these coatings is shown by the adhesion to the metal substrate, which must be very high also in view of the temperatures of use of the manufactured articles, which can sometimes be very high.

A good adhesion was obtained with the presence of chromic acid in the aqueous dispersion of the polymer, in particular in combination with phosphoric acid. This system is not allowable if the treated articles are used in the alimentary field, due to the high toxicity of the chromic acid which is present, even if in trace amounts, in the obtained layer of polymeric coating.

THE PRESENT INVENTION

The purpose of the present invention is to provide a coating layer performing the function of a primer, with a very high adhesion to the substrate, free from highly toxic components, easily and reliable to be applied to the article to be coated.

Providing a coating layer endowed with these characteristics is possible by using the composition according to the invention, which is constituted by an aqueous dispersion of fluorinated polymer, containing, according to determined ratios, an alkoxysilane soluble in the aqueous phase at a pH value comprised within the range of from 8 to 10, and magnesium and/or aluminum in the form of cations complexed by a hydroxy- or an aminocarboxy acid.

The amount of alkoxysilane is comprised within the range of from 0.05 to 0.4 parts by weight (pbw) per 1 pbw of fluorinated polymer, preferably of from 0.15 to 0.22 pbw.

The amount of metal cation is comprised within the range of from 0.001 to 0.05 pbw per 1 pbw of fluorinated polymer, preferably of from 0.02 to 0.04 pbw.

The amount of complexing agent for the metal cation is comprised within the range of from 1 to 4 mol per metal atom, preferably of from 1 to 2 mol per each metal atom.

Alkoxysilanes useful for the composition according to the invention are those which contain 2-3 alkoxy groups, water-soluble at pH 8-10. Thanks to their good solubility, suitable are those which contain amino groups in their alkyl radical. Water-insoluble alkoxysilanes can be used after a partial hydrolysis aimed at rendering them soluble. For exemplifying purposes, 3-aminopropyl-triethoxysilane and N-β-(aminoethyl)-γ-aminopropyl-trimethoxysilane can be mentioned, for the direct use, as well as γ-methacryloxypropyl-trimethoxysilane and γ-glycidyloxypropyl-trimethoxysilane, which must undergo a preliminary partial hydrolysis at pH 3–5 to be sufficiently soluble in water at pH 8–10.

The fluorinated polymer can be one of those already used in the prior art, such as polytetrafluoroethylene (PTFE), polymers of $C_2F_4$ modified with small amounts of a, mostly fluorinated, comonomer, $C_2F_4$ polymers with other fluoroolefins, and the like.

As the complexing acids for Mg and Al cations, tartaric acid, citric acid, glycolic acid, amino-acetic acid, and the like, can be mentioned.

As already said, the aqueous-medium composition according to the invention must have a pH comprised within the range of from 8 to 10, preferably of from 9 to 9.5. The pH value can be adjusted by adding basic substances, such as $NH_3$, NaOH, KOH, LiOH.

This formulation can be pigmented according to traditional methods known to those skilled in the art, diluted with deionized water and further stabilized by adding non-ionic surfactants, preferably belonging to the class of the polyethoxylated alkylphenols containing from 8 to 90 ethoxy molecules per phenol molecule, at a concentration comprised within the range of from 0.5 to 8% by weight, referred to the dry polymer. The so-obtained paint can be applied onto previously sand-blasted and degreased metal substrates, by using the most common application techniques (spray-painting, flow-painting, roller-coating, etc.), in order to have a film which, once sintered, has a thickness comprised within the range of from 1 to 20 microns, preferably of from 3 to 10 microns.

The so-obtained coating results to be adherent to the metal support. The composition according to the invention can be advantageously used on surfaces of aluminum, iron, and of their alloys.

The following Examples are supplied for the purpose of illustrating the present invention, which in no way should be construed as being limited to them or by them.

EXAMPLE 1

8 g of $(MgCO_3)_4.Mg(OH)_2.5H_2O$ was dissolved in 40 g of deionized water, containing 10.5 g of citric acid. Then 12 g was added of dibasic ammonium citrate. The solution was filtered and its weight was adjuested at 75 g with deionized water.

The primer paint was then prepared by blending, in the order:

| | |
|---|---|
| 60%-water PTFE suspension, dispersed with 3.5% of Triton X-100 | 20 g |
| deionized water | 10 g |
| Mg solution | 17.6 g |
| 3-aminopropyl-triethoxysilane | 2.4 g |

The solution pH was adjusted at the value of 9.3 by adding LiOH.

This paint was applied by means of a film-spreader on an aluminum support, which had been previously sand-blasted and degreased with toluene. The film was sintered at 400° C. for 9 minutes, thus a 7-micron thick coating being obtained; on said coating, the adhesion test was carried out as described by the ASTM D3359-78 Standard: by squaring on the coated surface, by using a special squaring instrument, a grid of 100 squares (each one of 1 mm of side), the percentage is observed of the squares of coating which are removed by an adhesive tape applied to the same grid and peeled away. Also after a dipping of the specimen in water for a 3-day time period, an adhesion degree of 5, according to the scale supplied by the same ASTM Standard, is observed.

EXAMPLE 2

A solution is prepared, which has the following composition:

| | |
|---|---|
| citric acid monohydrate | 31.3 g |
| $(MgCO_3)_4.Mg(OH)_2.5H_2O$ | 11.3 g |
| 30% $NH_4OH$ | 16 g |
| deionized water | to 100 g |

The pH value of this solution is 9.
The primer paint is prepared by blending:

| | |
|---|---|
| Aqueous PTFE suspension at 60% by weight, dispersed with 3.5% of Triton X-100 | 45 g |
| aqueous dispersion at 20% of thermostable black F-6331 (Holland) pigment | 20 g |
| 3-aminopropyl-triethoxysilane | 5 g |
| Mg solution at pH 9 | 17.6 g |

This paint is sprayed onto an aluminum substrate, to yield a film which, after sintering at 400° C. for 9 minutes, shows a thickness of 7 microns. The adhesion test gave, in this Example too, an adhesion degree of 5.

EXAMPLE 3

The following solution is prepared:

| | |
|---|---|
| deionized water | 50 g |
| $Al(NO_3)_3.9H_2O$ | 29.13 g |
| citric acid monohydrate | 31.3 g |
| $NH_4OH$ at 32% | 23.5 g |

This solution is adjusted at pH 9 with NaOH, and then at 200 g with deionized water.

This solution is used for preparing a primer paint having the following composition:

| | |
|---|---|
| PTFE suspension at 60% by weight, dispersed with 3.5% of Triton X-100 | 45 g |
| aqueous suspension at 20% by weight of black F-6331 pigment | 20 g |
| 3-aminopropyl-triethoxysilane | 5 g |
| Al solution at pH 9 | 20 g |
| deionized water | 10 g |

This paint is sprayed onto an aluminum sheet (dimensions: 20 cm×10 cm, thickness 1 mm) in order to obtain a film which, after sintering at 400° C. for 9 minutes, yields a thickness of 6 microns. Also in this case, the adhesion degree results to be equal to 5.

EXAMPLE 4

A paint is prepared which has the following composition:

| | |
|---|---|
| PTFE suspension at 60% by weight, dispersed with 3.5% of Triton X-100 | 45 g |
| aqueous suspension at 20% by weight of black F-6331 pigment | 20 g |
| 3-aminopropyl-triethoxysilane | 5 g |
| Mg solution prepared for Example 2 | 15 g |
| deionized water | 15 g |

This paint is used to coat an aluminum substrate by means of a spray gun. The film obtained after sintering at 400° C. for 9 minutes, shows a thickness of 7 microns and a good adhesion to the support.

EXAMPLE 5

The same solution of Al used in Example 3 is used for preparing a primer paint which has the following composition:

| | |
|---|---|
| PTFE suspension at 60% by weight, | 45 g |
| aqueous suspension at 20% by weight of black F-6331 pigment | 20 g |
| N—$\beta$-(aminoethyl)-$\gamma$-aminopropyl-trimethoxysilane | 5 g |
| Al solution at pH 9 | 20 g |
| deionized water | 10 g |

When sprayed on a sand-blasted aluminum substrate this paint forms a film which, after sintering according to the modalities as disclosed in the preceding examples, shows a good adhesion to the support.

EXAMPLE 6

The paint having the composition of Example 1 is prepared, wherein instead of 3-aminopropyl-triethoxysilane, a same amount of 4.8% is used of the compound -methacryloxypropyltrimethoxysilane, not previously hydrolised (and hence insoluble under the application conditions).

The paint is applied by means of a film-spreader and is sintered at 400° C. for 9 minutes. The resulting film, having a thickness of 6 microns, shows an adhesion level lower than of Example 1 (value 2 of ASTM scale).

COMPARATIVE EXAMPLE 1A

A primer paint is prepared as follows:

| | |
|---|---|
| PTFE suspension at 60% by weight, dispersed with 3.5% of Triton X-100 | 45 g |
| aqueous dispersion at 20% by weight, of thermostable black F-6331 pigment (Holland) | 20 g |
| Aqueous solution of $Na_2SiO_3.9H_2O$ at 23%, equivalent to 0.016 gram-atoms of Si | 20 g |
| deionized $H_2O$ | 15 g |

This paint was applied on a sandblasted aluminum substrate by means of a film-spreader in such a way as to obtain, after sintering at 400° C. for 7 minutes, a coating having a thickness of 6 microns. Such a film does not result to have a good adhesion, above all, after the specimen being kept dipped in water for some hours.

COMPARATIVE EXAMPLE 2A

A primer paint is prepared with the following composition:

| | |
|---|---|
| PTFE suspension at 60% | 45 g |
| aqueous suspension at 20% by weight of black F-6331 | 20 g |
| 3-aminopropyl-triethoxysilane (M.W. = 221,37); Si = 0.0223 gram-atoms | 5 g |

| -continued | |
|---|---|
| deionized water | 10 g |

When applied on a sandblasted aluminum substrate by means of a film-spreader, this paint produces a film which, after sintering at 390° C. for 7 minutes, does not show a good adhesion to the support (coating thickness=7 microns).

COMPARATIVE EXAMPLE 3A

A primer paint is produced, which is analogous to that of Example 1 with the only variant of the use of sodium silicate (1.32 g of $Na_2SiO_3$) instead of 3-aminopropyl-triethoxysilane.

The contemporaneous presence of Mg ions and silicate causes an immediate and intense precipitation.

A dispersion is thus obtained, which is no longer spreadable on the aluminum support.

What we claim is:

1. Composition suitable for forming a highly adherent coating layer on a metal surface, comprising an aqueous dispersion at a pH within the range of from 8 to 10, of a fluorinated polymer, containing an alkoxysilane soluble in the aqueous phase at pH 8–10, magnesium and/or aluminum in the form of cations complexed with a hydroxy- or amino-carboxy acid, the amount of alkoxysilane being within the range of from 0.05 to 0.4 parts by weight per part of fluorinated polymer, and the amount of metal cation being within the range of from 0.001 to 0.005 parts by weight per part of fluorinated polymer.

2. Composition according to claim 1, wherein the fluorinated polymer is polytetrafluoroethylene.

3. Composition according to claim 1, wherein the complexing acid for Mg or Al cations is selected from the group consisting of: tartaric acid, citric acid, aminoacetic acid, glycolic acid.

4. Composition according to claim 1, wherein the alkoxyxilane is 3-aminopropyl-triethoxysilane or N-$\beta$-(aminoethyl-$\gamma$-aminopropyl-trimethoxysilane.

5. Composition according to claim 1, wherein the alkoxysilane is selected from the group consisting of $\gamma$-glycidoxypropyl-trimethoxysilane and $\gamma$-methacryloxypropyl-trimethoxysilane previously partially hydrolysed at pH 3–5.

* * * * *